United States Patent [19]

Gray et al.

[11] Patent Number: 5,560,646
[45] Date of Patent: Oct. 1, 1996

[54] AIR BAG DOOR ARRANGEMENT

[75] Inventors: John Gray, Union; Bruce Batchelder, Lee, both of N.H.; Jim Rogers, Berwick; Robert Booth, Sanford, both of Me.

[73] Assignee: Davidson Textron, Dover, N.H.

[21] Appl. No.: 427,010

[22] Filed: Apr. 24, 1995

[51] Int. Cl.⁶ ................................................ B60R 21/16
[52] U.S. Cl. .................................. 280/728.3; 280/732
[58] Field of Search .......................... 280/728.1, 728.2, 280/728.3, 732, 752

[56] References Cited

U.S. PATENT DOCUMENTS

| | | | |
|---|---|---|---|
| 4,893,833 | 1/1990 | DiSalvo | 282/732 |
| 4,911,471 | 3/1990 | Hirabayashi | 280/732 |
| 5,082,310 | 1/1992 | Bauer | 280/732 |
| 5,275,432 | 1/1994 | Pray et al. | 280/728.2 |
| 5,280,947 | 1/1994 | Cooper | 280/728.3 |
| 5,340,149 | 8/1994 | Gajewski | 280/732 |
| 5,403,033 | 4/1995 | Koma | 280/732 |

FOREIGN PATENT DOCUMENTS 4-78637   3/1992   Japan .................................. 280/728.3

Primary Examiner—Paul N. Dickson
Attorney, Agent, or Firm—Reising, Ethington, Barnard & Perry

[57] ABSTRACT

An air bag door arrangement is incorporated in an instrument panel that has a substrate and an uninterrupted covering for the substrate. The substrate includes an air bag opening that is closed by a door. The door has a hinged end that is clamped to the substrate by a frame that is beneath the substrate, a reinforcement bar that is above the substrate and a plurality of fasteners that force the frame and reinforcement bar toward each other. An air bag canister is attached to the frame beneath the air bag opening of the substrate and the frame is attached to automotive body structure so that the substrate is isolated from the reaction forces of the canister when an air bag housed in the canister inflates and pushes the door through the instrument panel covering.

12 Claims, 2 Drawing Sheets

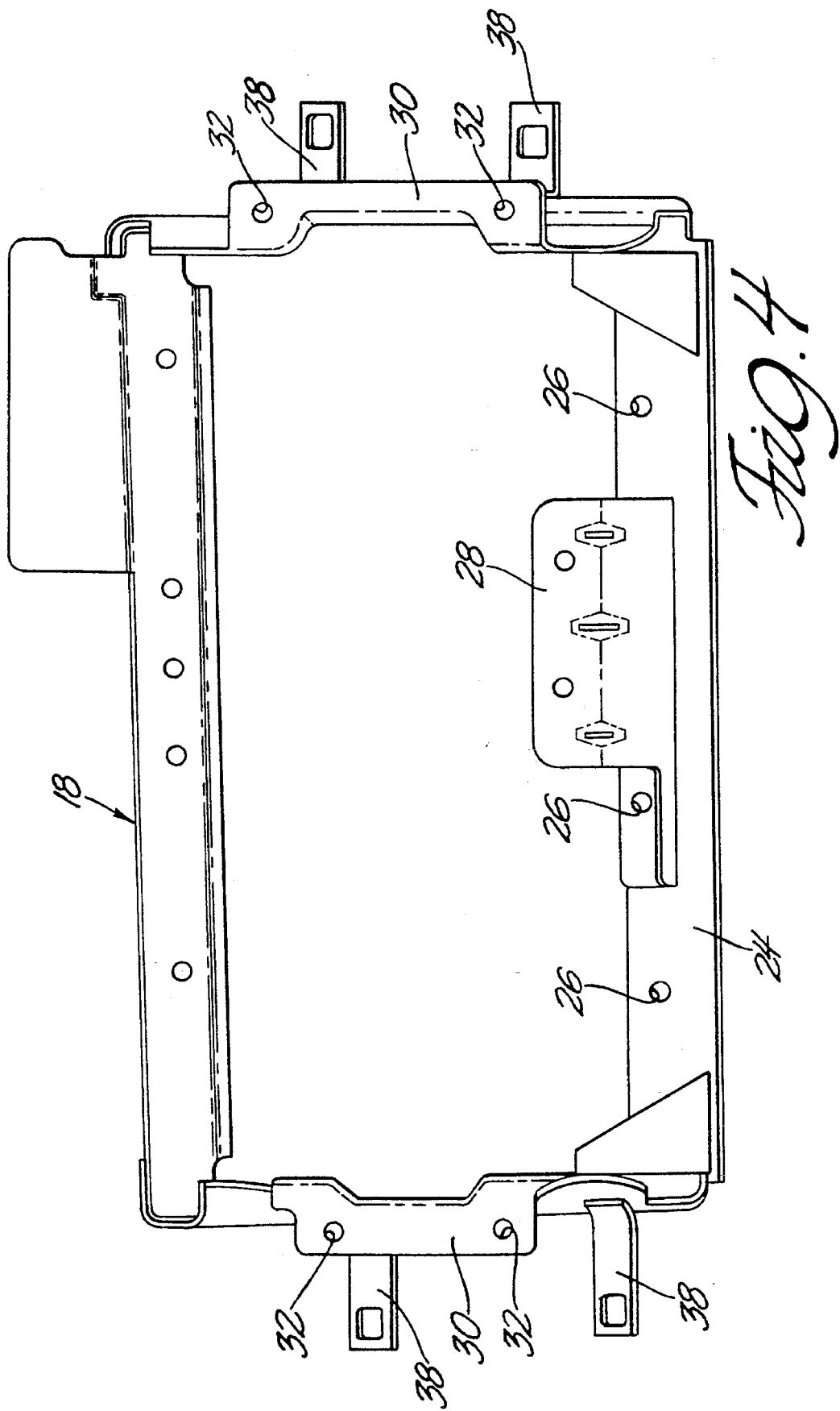

AIR BAG DOOR ARRANGEMENT

BACKGROUND OF THE INVENTION

This invention relates to an air bag door arrangement for an air bag canister that is located behind an automotive trim product, such as an instrument panel. The invention is applicable to separate door arrangements but is particularly well suited for an integral air bag door arrangement in which the covering for the air bag door is an integral part of the covering for the trim product.

U.S. Pat. No. 5,280,947 granted to Robert Cooper Jan. 25, 1994 discloses an integral air bag door arrangement that includes a sheet metal door assembly. The sheet metal door assembly is attached to a substrate and concealed by an outer uninterrupted cover for the substrate which forms part of an automotive trim product such as an instrument panel, console or steering wheel pad.

In the Cooper arrangement, the sheet metal door assembly has an H-shaped cut that provides two air bag doors that are integrally attached to a rectangular frame at opposite sides of the frame. This rectangular frame and a structural support for an air bag canister are attached to the substrate by fasteners such as rivets, heat stakes, bolts or screws. These fasteners are spaced along the rectangular frame of the sheet metal door assembly as shown in FIG. 1 of the Cooper patent.

In the Cooper arrangement, the reaction force of the air bag canister is applied to the substrate and the integrally attached doors are bent around the substrate when the air bag is deployed as shown in FIG. 3 of the Cooper patent.

SUMMARY OF THE INVENTION

The object of this invention is to provide an air bag door arrangement in which the attachment of the air bag door to the substrate is reinforced and/or the substrate is isolated from the reaction force of the air bag canister resulting from the air bag deployment.

A feature of the invention is that the arrangement includes an air bag door that is attached to the trim product substrate by fasteners that pass through the substrate and fasten to a reinforcement bar that is located on the covered side of the substrate.

Another feature of the invention is that the arrangement includes an air bag door having an end that is sandwiched between a frame and a trim product substrate and attached to the substrate by fasteners that clamp the end to the substrate by means of the frame and a reinforcement bar that is located on the covered side of the substrate.

Still another feature of the invention is that the arrangement includes an air bag door that is attached to the substrate by a dual purpose frame that supports an air bag canister and that is adapted to isolate the substrate from the reaction force of the canister produced by deployment of the air bag.

Still yet another feature of the invention is that the arrangement includes an air bag door having an end that is clamped to the substrate by a reinforcement bar that is located on the covered side of the substrate and a dual purpose frame that supports the air bag canister and that is adapted to isolate the substrate from the reaction force of the canister produced by deployment of the air bag.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 4 is a bottom view of the dual purpose frame of the invention taken substantially along the line 4—4 of FIG. 2 looking in the direction of the arrows.

DESCRIPTION OF THE INVENTION

Figure 1:
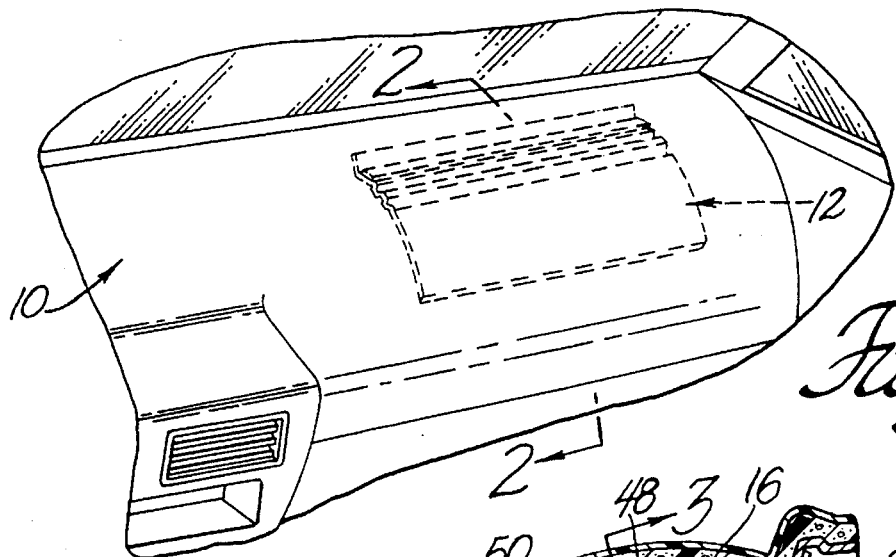
FIG. 1 is a fragmentary perspective view of an automobile interior showing an air bag door arrangement in accordance with the invention.

Referring now to the drawing, FIG. 1 illustrates an interior of an automobile that includes an instrument panel 10 that is equipped with an air bag arrangement of the invention which is indicated generally at 12.

The air bag arrangement 12 comprises a door 14 that is attached to a substrate 16 of the instrument panel 10 to close an opening in the substrate 16 for deployment of an air bag into the passenger compartment of the automobile. The door 14 is customarily made of aluminum or other light metal, but may be made of a molded plastic material. The substrate 16 is generally molded of a fiber reinforced structural plastic material.

The door 14 has a hinged end 17 that is attached to the substrate 16 by clamping the hinged end beneath an edge portion of the substrate 16 that is next to the air bag opening. The hinged end 17 is clamped to the substrate by a frame 18 that is beneath the substrate 16, a reinforcement bar 20 that is above the edge portion of the substrate 16, that is on the covered side of the substrate 16, and a plurality of fasteners 22, such as sheet metal screws that force the frame 18 and reinforcement bar 20 toward each other.

Figure 2:
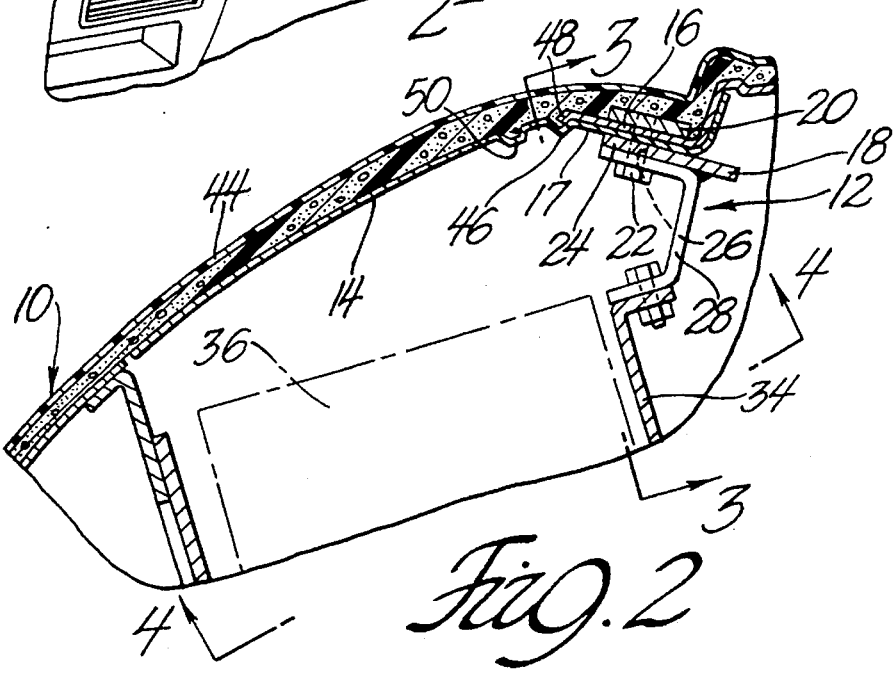
FIG. 2 is a section taken substantially along the line 2—2 of FIG. 1 looking in the direction of the arrows.

The frame 18 is generally rectangular as best shown in FIG. 4. It includes a front bar 24 that has a plurality of holes 26 for receiving the shanks of the fasteners 22 that are attached to the reinforcement bar 20. The frame 18 further includes a front bracket 28 that is welded or otherwise suitably secured to the front bar 20 and two side flanges 30. The bracket 28 and the two side flanges 30 each have two holes 32. These six holes 32 are used to bolt or otherwise suitably attach an air bag canister 34 beneath the air bag opening of the substrate 16 as shown in FIG. 2.

The air bag canister 34 houses a deflated air bag which is schematically shown at 36 and which operates in a well known manner. Briefly, the air bag is inflated by a gas generator (not shown) and deployed in the passenger compartment through the air bag opening when the automobile decelerates at a rate corresponding to a front end collision.

Figure 3:
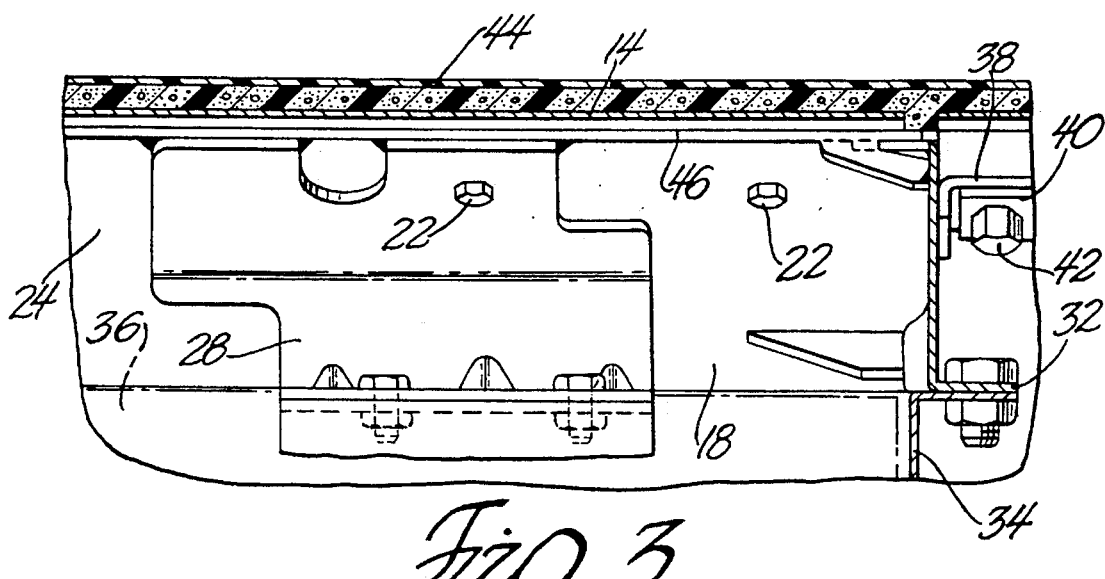
FIG. 3 is a section taken substantially along the line 3—3 of FIG. 2 looking in the direction of the arrows.

Returning to FIG. 4, the frame 18 further includes four side brackets 38. Two brackets are attached to each side of the frame 18. These brackets are used to attach the frame 18 to automotive body structure such as a cross car beam, front of dash panel, fire wall, or floor pan. The automobile structure is schematically represented at 40 in FIG. 3. The frame 18 is attached to the automobile structure 40 by the side brackets 38 and fasteners 42, such as nuts and bolt shown in FIG. 3.

The instrument panel 12 includes a covering 44 that covers the substrate 16 and the door 14 so that the covering of the door is an integral part of the covering of the instrument panel 12. The covering 44 comprises an outer skin and an underlying layer of foam, that are customarily made of compatible thermoplastic materials, such as polyvinylchloride and polyvinylchloride foam or polyurethane and polyurethane foam. The outer skin is preferably weakened to provide tear lines for separating the portion that covers the door 14 in a predictable manner when the air bag is deployed. These tear lines can be internal and invisible or external style lines.

The door 14 is attached to the substrate 16 before the door 14 and substrate 16 are covered by the outer covering 44. The canister 34 may be attached to the frame 18 either before or after the instrument panel is covered. In fact the canister 34 may be attached to the frame 18 after the instrument panel 10 is installed in the automobile.

In any event, the installed instrument panel 10 and canister 34 work in a well known manner. When the air bag 36 is deployed, the air bag 36 engages the metal door 14 and pivots the metal door 14 outwardly about the edge of the substrate 16. The metal door 14 preferably includes a crease 46 that underlies an inturned lip 48 of the substrate 16. The crease 46 defines a primary hinge line of the door 14 which then pivots about the inturned lip 48 to open. The metal door 14 also preferably includes a second crease 50 that is spaced from the primary hinge crease 46 toward the free end of the door 14. This second crease provides a secondary hinge line which allows the door 14 to flex without bending at the hinge point during the initial deployment of the air bag.

As the door 14 is pivoted outwardly by the inflating air bag, the covering 44 is ruptured at the front or free edge of the door 14 and then along the sides of the door 14 forming a flap in the covering 44 that is opened along with the door 14 under the action of the inflating air bag 36. The reaction force imparted to the canister 34 by the inflating air bag 36 is transferred to the automotive body structure 40 by the frame 18 and brackets 38. This isolates the substrate 16 from the reaction force of the canister 34 produced by the inflation of air bag 34.

This isolation and the reinforced attachment each permit use of a thinner substrate while assuring that the door 14 remains attached to the substrate when the air bag 34 is deployed. On the other hand the isolation in combination with the reinforced attachment provides the best advantage.

The invention has been illustrated in conjunction with an integral air bag door arrangement. However, the invention can also be used in conjunction with a separate door arrangement in which the covering for the door is separate from the covering for the trim product and applied to the door before it is attached to the trim product. In other words, the invention has been described in an illustrative manner, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An air bag arrangement including a trim product having a substrate that has an air bag opening and an uninterrupted covering over the opening comprising, a door that has an end that is attached to the substrate by clamping the end beneath an edge portion of the substrate that is next to the air bag opening, the end being clamped to the substrate by a member that is beneath the substrate, a reinforcement bar that is above the edge portion of the substrate, and a plurality of fasteners that force the member and reinforcement bar toward each other, the member including means for attaching an air bag canister beneath the air bag opening of the substrate, and the member including further means for transferring a reaction force to automotive body structure so that the substrate is isolated from the reaction force of an inflating air bag housed in the air bag canister.

2. The air bag door arrangement as defined in claim 1 wherein the member is a generally rectangular frame that includes a bar, a bracket that is secured to the bar of the frame and side flanges, and an air bag canister is attached to the frame by the bracket and the side flanges.

3. The air bag arrangement as defined in claim 1 wherein the member includes side brackets for attaching the frame to the automotive body structure so that a reaction force imparted to the canister by an inflating air bag is transferred to the automotive body structure by the frame and the brackets and the substrate is isolated from the reaction force of the inflating air bag.

4. The air bag arrangement as defined in claim 1 wherein the trim product has a covering that includes a portion over the opening for covering the door.

5. An air bag arrangement for a trim product having a substrate that has an air bag opening comprising, a door that has an end that is attached to the substrate by clamping the end beneath an edge portion of the substrate that is next to the air bag opening, the end being clamped to the substrate by a generally rectangular frame that is beneath the substrate and the end of the door, a reinforcement bar that is above the edge portion of the substrate and a plurality of fasteners that force the frame and reinforcement bar toward each other, the frame including a bar that has a plurality of holes for receiving shanks of the fasteners that are attached to the reinforcement bar.

6. An air bag arrangement for a trim product having a substrate that has an air bags opening comprising, a door that has an end that is attached to the substrate by clamping the end beneath an edge portion of the substrate that is next to the air bag opening, the end being clamped to the substrate by a generally rectangular frame that is beneath the substrate and the end of the door, a reinforcement bar that is above the edge portion of the substrate and a plurality of fasteners that force the member and reinforcement bar toward each other, the frame further including means for attaching an air bag canister beneath the air bag opening of the substrate.

7. The air bag arrangement as defined in claim 6 wherein the frame includes means for transferring a reaction force to automotive body structure so that the substrate is isolated from the reaction force of an inflating air bag housed in an air bag canister attached to the frame.

8. The air bag arrangement as defined in claim 6 wherein the frame further includes side brackets for attaching the frame to an automotive body structure so that a reaction force imparted to a canister attached to the frame by an inflating air bag is transferred to the automotive body structure by the frame and brackets and the substrate is isolated from the reaction force of the inflating air bag.

9. An air bag arrangement for a trim product having a substrate that has an air bag opening comprising, a door that has an end that is attached to the substrate by clamping the end beneath an edge portion of the substrate that is next to the air bag opening, the end being clamped to the substrate by a generally rectangular frame that is beneath the substrate and the end of the door, a reinforcement bar that is above the edge portion of the substrate and a plurality of fasteners that force the member and reinforcement bar toward each other, the frame including a bar, a bracket that is secured to the bar of the frame and side flanges, and an air bag canister that is attached to the frame by the bracket and the side flanges.

10. An air bag arrangement for a trim product having a substrate that has an air bag opening comprising;

a door that has an end that is attached to the substrate by clamping the end beneath an edge portion of the substrate that is next to the air bag opening, the end being clamped to the substrate by a member that is beneath the end of the door, a reinforcement bar that is above the edge portion of the substrate and a plurality of fasteners that force the member and reinforcement bar toward each other, the air bag door being a metal door that includes a crease that underlies an inturned lip of the substrate and that defines a hinge line of the door when the door is pivoted open.

11. The air bag door arrangement as defined in claim 10 wherein the metal door further includes a second crease that is spaced from the aforementioned crease toward a free end of the door.

12. An air bag arrangement including a trim product having a substrate that has an air bag opening comprising, a door that has an end that is attached to the substrate by clamping the end beneath an edge portion of the substrate that is next to the air bag opening, the end being clamped to the substrate by a member that is beneath the end of the door, a reinforcement bar that is above the edge portion of the substrate and a plurality of fasteners that force the member and reinforcement bar toward each other, the trim product having an uninterrupted covering over the opening and the reinforcement bar being between the substrate and the uninterrupted covering, and the member being a generally rectangular frame that includes a bar that has a plurality of holes for receiving shanks of the fasteners that force the member and the reinforcement bar toward each other.

* * * * *